(12) United States Patent
Rudisill et al.

(10) Patent No.: US 6,831,025 B2
(45) Date of Patent: Dec. 14, 2004

(54) MULTIPLE COMPONENT SPUNBOND WEB AND LAMINATES THEREOF

(75) Inventors: Edgar N. Rudisill, Nashville, TN (US); Vishal Bansal, Richmond, VA (US); Michael C. Davis, Midlothian, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 13 days.

(21) Appl. No.: 09/883,471

(22) Filed: Jun. 18, 2001

(65) Prior Publication Data

US 2003/0003826 A1 Jan. 2, 2003

(51) Int. Cl.$^7$ .............................. D04H 3/16; D04H 1/56; B32B 5/26; B32B 27/02
(52) U.S. Cl. ...................... 442/401; 442/361; 442/362; 442/364; 442/382; 442/389; 442/392; 442/400; 428/373; 428/374
(58) Field of Search .............................. 442/361, 362, 442/364, 382, 389, 392, 400, 401, 36, 365, 373; 428/373, 374, 198, 393, 196, 401; 128/849

(56) References Cited

U.S. PATENT DOCUMENTS

| | | | |
|---|---|---|---|
| 4,477,516 A | 10/1984 | Sugihara et al. ............ 442/361 |
| 4,990,204 A | * 2/1991 | Krupp et al. ............... 156/167 |
| 5,336,552 A | 8/1994 | Strack et al. ............... 442/361 |
| 5,372,885 A | 12/1994 | Tabor et al. ................ 428/373 |
| 5,484,645 A | 1/1996 | Lickfield et al. |
| 5,503,907 A | 4/1996 | Gessner et al. ............. 428/198 |
| 5,662,978 A | 9/1997 | Brown et al. ................. 428/57 |
| 5,733,822 A | 3/1998 | Gessner et al. |
| 5,883,026 A | 3/1999 | Reader et al. |
| 5,901,706 A | 5/1999 | Griesbach et al. .......... 128/849 |
| 6,187,699 B1 | 2/2001 | Terakawa et al. ........... 442/382 |
| 6,355,348 B1 | 3/2002 | Takesue et al. ............. 428/373 |
| 6,420,285 B1 | 7/2002 | Newkirk et al. ............. 442/364 |

FOREIGN PATENT DOCUMENTS

| | | |
|---|---|---|
| EP | 0 465 203 A1 | 1/1992 |
| EP | 0 691 427 A1 | 1/1996 |
| GB | 2121423 A | 12/1983 |
| JP | 5-124144 | 5/1993 |

* cited by examiner

Primary Examiner—Cheryl A. Juska
Assistant Examiner—Jenna-Leigh Befumo

(57) ABSTRACT

A spunbond nonwoven fabric is provided which is formed from continuous multiple component filaments which include a polyester component and a polyethylene component. The polyethylene component is a blend of high density polyethylene and a first linear low density polyethylene. The spunbond filaments are preferably formed in a sheath-core configuration with the polyester component in the core and the polyethylene component in the sheath. Composite sheets are provided which include the multiple component spunbond layer and a meltblown layer, wherein the meltblown fibers include a second linear low density polyethylene. The linear low density polyethylenes are preferably formed by polymerization of ethylene with an alpha-olefin co-monomer, where the same co-monomer is used in each of the first and second linear low density polyethylenes.

29 Claims, No Drawings

MULTIPLE COMPONENT SPUNBOND WEB AND LAMINATES THEREOF

BACKGROUND OF THE INVENTION

1. Field of the Invention

This invention relates to multiple component spunbond nonwoven fabrics and composite sheets thereof, which are soft, drapeable, and strong and which can be used in medical applications which require sterilization with gamma-radiation.

2. Description of Related Art

Nonwoven fabrics comprising multiple component fibers are known in the art. For example, Sugihara et al. U.S. Pat. No. 4,477,516 describes nonwoven fabrics obtained by forming a fiber aggregate of hot-melt-adhesive composite fibers composed of a first component of a polyethylene resin composition consisting of 50 to 100 weight percent of a straight chain low density polyethylene and 50 to 0% of another kind of polyethylene and a second component of a fiber-formable polymer having a melting point higher than either polyethylene in the first component by 30° C. or more. The nonwoven fabrics are described as being prepared by processes such as carding, air-laying, dry pulping, and wet paper-making processes. Tabor et al. U.S. Pat. No. 5,372,885 describes preparation of bicomponent fibers and nonwoven fabrics therefrom by contacting under thermally bonding conditions (a) a first component being at least one high performance polymer such as poly(ethylene terephthalate), poly(butylene terephthalate), nylon or the like, and (b) a second component which is olefinic and which forms at least a portion of the fiber's surface characterized by including in the second component at least one grafted olefinic polymer having pendant succinic acid or succinic anhydride groups. Preferably the second component comprises at least one grafted ethylene polymer. Filaments comprising the acid-containing grafted linear ethylene polymer or polymer blends are dyeable.

Multi-layer nonwoven laminates comprising spunbond and melt-blown layers, such as spunbond-meltblown-spunbond ("SMS") nonwovens are known in the art. In SMS nonwoven laminates, the exterior layers are spunbond nonwoven webs that contribute strength to the overall composite, while the middle or core layer comprises a meltblown web which provides barrier properties. Similarly, composite nonwovens comprising additional layers of spunbond or meltblown webs can be prepared, as in spunbond-meltblown-meltblown-spunbond ("SMMS") nonwovens. Terakawa et al. U.S. Pat. No. 6,187,699 describes multi-layer nonwoven fabrics which comprise (a) a composite continuous filament spunbond nonwoven composed of a low melting point resin component and a high melting point resin component with the low melting point resin forming at least a portion of the surface of the spunbond fibers and (b) a composite meltblown extra-fine-fiber nonwoven fabric having a fiber diameter of 10 μm or less and being composed of a low melting point resin and a high melting point resin with the low melting point resin forming at least a portion of the surface of the meltblown fibers. The fibers in each of the nonwoven layers are thermally fused. Examples of combinations of resins that can be used to prepare the composite filaments or fibers include high density polyethylene/polypropylene, high density polyethylene/polyethylene terephthalate, and a mixture of linear low-density polyethylene and high-density polyethylene/polypropylene. The composite fibers can be sheath-core, side-by-side, multi-layer, etc.

For certain nonwoven end uses, such as medical garments, it is desirable that the nonwoven fabrics have good strength and barrier properties while also being as soft and drapeable as possible. For medical end uses, it is also desirable that the nonwoven fabrics be made of fibers of polymers which can be sterilized with gamma radiation. SMS fabrics have traditionally been polypropylene-based and have the limitation that they cannot be sterilized with gamma radiation because the fabrics are discolored and weakened as a result of the sterilization process. In addition, gamma-irradiation of polypropylene based fabrics results in the generation of unpleasant odors. This presents a significant problem for polypropylene-based SMS fabrics because radiation sterilization is commonly used throughout the medical industry.

There remains a need for low-cost nonwoven fabrics which have an improved combination of strength, barrier properties, drapeability, and softness and which can be sterilized by gamma radiation without significantly degrading the properties of the fabric and/or generating unpleasant odors.

BRIEF SUMMARY OF THE INVENTION

One embodiment of the present invention is a spunbond nonwoven fabric comprising continuous multiple component filaments having a cross-section, a length, and a peripheral surface and comprising a polyester component and a polyethylene component arranged in substantially distinct zones across the cross-section of the multiple component filaments and extending substantially continuously along the length of the multiple component filaments, at least a portion of the peripheral surface of the multiple component filaments comprising the polyethylene component, and the polyethylene component comprising a blend of linear low density polyethylene and high density polyethylene, the high density polyethylene being present in an amount greater than 50 weight percent of the polyethylene component.

Another embodiment of the present invention is directed to a composite sheet comprising a first layer having a first side and an opposite second side; and a second layer attached to the first side of the first layer comprising a spunbond web of continuous multiple component filaments, the multiple component filaments having a cross-section, a length, and a peripheral surface and comprising a polyester component and a polyethylene component arranged in substantially distinct zones across the cross-section of the multiple component filaments and extending substantially continuously along the length of the multiple component filaments, the polyethylene component comprising a blend of linear low density polyethylene and high density polyethylene, at least a portion of the peripheral surface of the multiple component filaments comprising the polyethylene component.

DETAILED DESCRIPTION OF THE INVENTION

The present invention is directed toward a multiple component continuous filament spunbond web and composites thereof. The multiple component spunbond web is comprised of filaments which include a polyester component and a polyolefin component. The polyolefin component comprises a first linear low density polyethylene and a high density polyethylene. The polyester component imparts strength to the bicomponent fibers while the polyethylene component imparts a soft hand and lowers the overall bending modulus of the fibers. In a preferred embodiment, two layers of the multiple component spunbond web are bonded to opposite sides of a multiple component meltblown web wherein the multiple component meltblown fibers comprise a second linear low density polyethylene. The first and second linear low density polyethylenes are copolymers of ethylene and an alpha-olefin. The same alpha-olefin is preferably used to prepare the first and second linear low density polyethylenes. The multiple component spunbond fabrics of the current invention are radiation sterilizable. A fabric is considered to be "radiation sterilizable" when sterilization of the fabric with gamma radiation does not cause a reduction in the strength of the fabric, noticeably change the appearance of the fabric, or cause the generation an objectionable odor.

High density polyethylenes generally spin well in conventional spunbond processes, with very low levels of volatile materials being emitted during spinning, resulting in substantially no formation of deposits on the spinning apparatus. However high density polyethylenes generally yield relatively stiff filaments which makes it difficult to lay the filaments down uniformly on a collecting surface during a spunbond process and provides non-uniform spunbond webs having a hard hand. In addition, the bonding window for high density polyethylene filaments is somewhat narrow. As used herein, the term "bonding window" means the range of temperatures (for example the temperature of calender rolls used to bond a spunbond web) over which bonding is successful. For high density polyethylene, this bonding window is typically from about 125° C. to 133° C. Below 125° C., the high density polyethylene is not hot enough to melt and bond and above 133° C., it will melt excessively.

Linear low density polyethylenes generally have a wider bonding window, between about 100° C. and 125° C., than high density polyethylenes and form spunbond webs having a desirable soft hand. However, formation of spunbond webs from linear low density polyethylene is complicated by the generation of high levels of volatile materials during extrusion of the linear low density polyethylene from the spinneret, causing deposits to build up on the spinneret face, quench ducts face, and inside the draw jet. High levels of deposit formation reduce productivity by requiring frequent shut-down of the spunbond process to permit removal of the deposits from the equipment.

It has been found that spunbond nonwoven fabrics of the current invention formed from continuous bicomponent sheath/core spunbond filaments comprising a polyester core and a polyethylene sheath, where the polyethylene sheath comprises relatively high levels of high density polyethylene blended with linear low density polyethylene, unexpectedly have similar properties, such as drapeability and softness, to spunbond nonwoven fabrics made from bicomponent spunbond filaments having a polyester core and a sheath of 100% linear low density polyethylene sheath, while retaining the spinning advantages of high density polyethylene described above. The spunbond nonwoven fabrics of the current invention also have higher grab tensile strength and abrasion resistance than spunbond nonwoven fabrics made from bicomponent spunbond filaments having a polyester core and a sheath of 100% high density polyethylene. The bonding window for the spunbond layers of the current invention is generally between about 110° C. and 130° C. Use of blends of high density polyethylene and linear low density polyethylene also reduces the overall cost of the multiple component spunbond fabrics compared to those which use linear low density polyethylene alone since high density polyethylenes are generally lower in cost than linear low density polyethylenes.

The term "linear low density polyethylene" (LLDPE) as used herein refers to linear ethylene/α-olefin co-polymers having a density of less than about 0.955 g/cm$^3$, preferably in the range of 0.91 g/cm$^3$ to 0.95 g/cm$^3$, and more preferably in the range of 0.92 g/cm$^3$ to 0.95 g/cm$^3$. The linear low density polyethylenes used in the current invention are prepared by co-polymerizing ethylene with minor amounts of an alpha,beta-ethylenically unsaturated alkene co-monomer (α-olefin), the α-olefin co-monomer having from 3 to 12 carbons per α-olefin molecule, and preferably from 4 to 8 carbons per α-olefin molecule. Alpha-olefins which can be co-polymerized with ethylene to produce LLDPE's useful in the current invention include propylene, 1-butene, 1-pentene, 1-hexene, 1-octene, 1-decene, or a mixture thereof. Preferably, the α-olefin is 1-hexene or 1-octene. Such polymers are termed "linear" because of the substantial absence of branched chains of polymerized monomer units pendant from the main polymer "backbone". The amount of the α-olefin co-monomer is generally sufficient to cause the density of the polymer to be in the range described above for LLDPE due to the presence of alkyl side-chains on the polymer molecule, yet the polymer remains in the "linear" classification. Linear low density polyethylenes useful in the present invention can be prepared using either Ziegler Natta or metallocene catalysts and those prepared using Ziegler Natta catalysts are preferred. Examples of suitable commercially available LLDPE's include those available from Dow Chemical Company, such as ASPUN Type 6811A (density 0.923 g/cm$^3$), Dow LLDPE 2500 (density 0.923 g/cm$^3$), Dow LLDPE Type 6808A (density 0.940 g/cm$^3$), ENGAGE® (Dow Chemical Co.) and the EXACT® and EXCEED™ series of LLDPE polymers from Exxon Chemical Company, such as Exact 2003 (density 0.921 g/cm$^3$).

The term "high density polyethylene" (HDPE) as used herein refers to polyethylene homopolymer having a density of at least about 0.94 g/cm$^3$, and preferably in the range of about 0.94 g/cm$^3$ to about 0.965 g/cm$^3$.

The term "polyester" as used herein is intended to embrace polymers wherein at least 85% of the recurring units are condensation products of dicarboxylic acids and dihydroxy alcohols with linkages created by formation of ester units. This includes aromatic, aliphatic, saturated, and unsaturated di-acids and di-alcohols. The term "polyester" as used herein also includes copolymers (such as block, graft, random and alternating copolymers), blends, and modifications thereof. A common example of a polyester is poly(ethylene terephthalate) (PET) which is a condensation product of ethylene glycol and terephthalic acid.

The term "meltblown fibers" as used herein, means fibers which are formed by extruding a melt-processable polymer through a plurality of capillaries as molten threads or filaments into a high velocity heated gas (e.g. air) stream. The high velocity gas stream attenuates the filaments of molten thermoplastic polymer material to reduce their diameter to between about 0.5 and 10 microns. Meltblown fibers are generally discontinuous fibers but can also be continuous. Meltblown fibers carried by the high velocity gas stream are generally deposited on a collecting surface to form a meltblown web of randomly dispersed fibers.

The term "spunbond" filaments as used herein means filaments which are formed by extruding molten thermoplastic polymer material as filaments from a plurality of fine capillaries of a spinneret with the diameter of the extruded filaments then being rapidly reduced by drawing. Spunbond filaments are generally continuous and usually have an average diameter of greater than about 5 microns. The spunbond filaments of the current invention preferably have an average diameter between about 7 and 15 microns, more preferably between about 10 and 15 microns. Spunbond nonwoven fabrics or webs are formed by laying spunbond filaments randomly on a collecting surface such as a foraminous screen or belt. Spunbond webs can be bonded by methods known in the art such as hot-roll calendering, through air bonding (generally applicable to multiple component spunbond webs), or by passing the web through a saturated-steam chamber at an elevated pressure. For example, the web can be thermally point bonded at a plurality of thermal bond points located across the spunbond fabric.

The term "nonwoven fabric, sheet or web" as used herein means a structure of individual fibers, filaments, or threads that are positioned in a random manner to form a planar material without an identifiable pattern, as opposed to a knitted or woven fabric.

The term "filament" is used herein to refer to continuous filaments whereas the term "fiber" is used herein to refer to either continuous or discontinuous fibers.

The terms "multiple component filament" and "multiple component fiber" as used herein refer to any filament or fiber that is composed of at least two distinct polymers which have been spun together to form a single filament or fiber. Preferably the multiple component fibers or filaments are bicomponent fibers or filaments which are made from two distinct polymers arranged in distinct zones across the cross-section of the multiple component fibers and extending along the length of the fibers. In the multiple component spunbond fibers of the current invention, each of the at least two polymeric components are preferably arranged in distinct substantially constantly positioned zones across the cross-section of the multiple component fibers and extend substantially continuously along the length of the fibers. Multiple component fibers are distinguished from fibers which are extruded from a homogeneous melt blend of polymeric materials. Multiple component fibers and filaments useful in the current invention include sheath-core and side-by-side fibers.

The term "multiple component web" as used herein refers to a nonwoven web comprising multiple component filaments or multiple component fibers. The term "bicomponent web" as used herein refers to a nonwoven web comprising bicomponent filaments or bicomponent fibers. The multiple component and bicomponent webs can comprise blends of multiple component fibers with single component fibers. The term "single component meltblown web" is used herein to refer to meltblown webs which are formed from a single polymer or a substantially homogeneous polymer blend as opposed to being formed from distinct zones of polymers arranged along the length of the fibers.

The polyethylene component of the spunbond filaments preferably comprises between about 10 to 60 weight percent linear low density polyethylene and between about 40 to 90 weight percent high density polyethylene. In a preferred embodiment, the polyethylene component comprises greater than 50 weight percent high density polyethylene. More preferably, the polyethylene component of the spunbond filaments comprises between about 10 to 40 weight percent linear low density polyethylene and between about 60 to 90 weight percent high density polyethylene.

The polymer blend can include other conventional additives such as dyes, pigments, antioxidants, UV stabilizers, spin finishes, and the like. The high density polyethylene and linear low density polyethylene can be blended together prior to extrusion in a spunbonding process, either by melt blending or dry blending. Melt blending can be accomplished with conventional blending equipment such as mixing extruders, Brabender mixers, Banbury mixers, roll mills, etc. The melt blend can be extruded and the extrudate cut to form pellets which are fed to the spunbonding process. Alternately, pellets of the individual polyethylenes can be dry blended and fed as a blend of pellets to the spunbonding process, with the pellets of each component being metered at a rate to produce the desired ratio of high density polyethylene to linear low density polyethylene. The melt indexes of the high density polyethylene and linear low density polyethylene are preferably in the range of about 10 to 40 g/10 min (measured according to ASTM D-1238; 2.16 kg @ 190° C.), more preferably in the range of about 15 to 30 g/10 min.

Polyesters suitable for use in the multiple component spunbond nonwovens include poly(ethylene terephthalate), poly(1,3-propylene terephthalate), and copolymers thereof with 5-sulfoisophthalic acid. In a preferred embodiment, the polyester component is poly(ethylene terephthalate) having a starting intrinsic viscosity in the range of 0.4 to 0.7 dl/g (measured according to ASTM D 2857, using 25 vol. % trifluoroacetic acid and 75 vol. % methylene chloride at 30° C. in a capillary viscometer), more preferably 0.5 to 0.6 dl/g.

The polyester and polyethylene components which are used to prepare the spunbond nonwovens of the current invention are selected such that the polyethylene component has a lower melting point than the polyester component so as to enhance thermal bonding of the spunbond web. Preferably each of the LLDPE and HDPE in the polyethylene component has a melting point that is at least 30° C. lower than the melting point of the polyester component.

In a preferred embodiment of the current invention, a SMS composite nonwoven is formed wherein the spunbond layers comprise bicomponent spunbond filaments having a sheath-core configuration with the polyester component in the core and the polyethylene blend component in the sheath and the meltblown layer comprises bicomponent meltblown fibers in a side-by-side configuration. The multiple component sheath-core spunbond filaments can have either a concentric or laterally eccentric cross-section.

The multiple component continuous filament spunbond webs useful in the current invention can be prepared using spunbonding methods known in the art. Spunbond filaments are generally round but can be made in a variety of other shapes (e.g. oval, tri-lobal or multi-lobal, flat, hollow, etc.) and configurations (e.g. symmetrical sheath-core, eccentric sheath-core, side-by-side, etc.). In a preferred embodiment of the current invention, the spunbond filaments are sheath-core filaments with the sheath comprising a blend of HDPE and LLDPE and the core comprising polyester. Side-by-side spunbond filaments can also be used. It may be desirable when spinning side-by-side filaments to include additives in the polyester or polyethylene components to improve adhesion between the two components and prevent splitting of the components during handling of the spunbond sheet. For example, Elvaloy® ethylene acrylate copolymers, available from DuPont (Wilmington, Del.) can be added to the polyethylene component to promote adhesion to the polyester component.

For end uses in which the spunbond fabric is used without forming a composite sheet, such as industrial protective apparels, wipes, filters, packaging materials, upholstery, etc. the spunbond fabric preferably has a basis weight of between 1.5 to 7.0 oz/yd$^2$ (51 to 238 g/cm$^2$), preferably between about 1.8 to 5.0 oz/yd$^2$ (61 to 170 g/cm$^2$), most preferably between about 1.8 to 3.0 oz/yd$^2$ (61 to 102 g/cm$^2$). However, when used in composite sheets, for example combined with one or more meltblown layers or with a film, the basis weight of an individual spunbond layer can be much lower, for example basis weights between about 0.3 and 0.9 oz/yd$^2$ (10 to 31 g/cm$^2$), preferably between about 0.5 to 0.7 oz/yd$^2$ (17 to 24 g/cm2) are generally useful in composite sheets.

The multiple component spunbond fabrics of the current invention can be bonded with other layers, including films and other nonwoven layers, to form multi-layer composite sheets. For example the multiple component spunbond fabric can be bonded to a breathable microporous film. Microporous films are well known in the art, such as those formed from a polyolefin (e.g. polyethylene) and particulate fillers. In a preferred embodiment, a composite sheet is formed with a meltblown web sandwiched between and bonded to two of the multiple component spunbond fabrics of the current invention. The meltblown web can be a single component meltblown web or a multiple component meltblown web wherein the meltblown fibers comprise linear low density polyethylene. Preferably the meltblown fibers comprise at least 60 weight percent of linear low density polyethylene. For example, the meltblown fibers can be formed from 100% linear low density polyethylene or a blend of between about 60 and 100 weight percent linear low density polyethylene and between about 0 to 40 weight percent high density polyethylene. The linear low density polyethylene used in the meltblown layer is preferably formed using the same α-olefin co-monomer as that used to form the linear low density polyethylene of the spunbond layer(s). The α-olefin co-monomer may be present in different amounts in the LLDPE of the meltblown layer and the LLDPE of the spunbond layer. Alternately, the LLDPE used in the meltblown layer can comprise the same LLDPE used in the spunbond layer.

In a preferred embodiment of the current invention, a composite nonwoven sheet is formed by sandwiching a bicomponent meltblown web comprising a polyethylene component which comprises a linear low density polyethylene between two bicomponent spunbond webs of the current invention and bonding the layers together. Preferably the bicomponent meltblown web is comprised of meltblown fibers comprising a polyethylene component which comprises linear low density polyethylene and a polyester component, the meltblown fibers being spun using a melt-blowing die in which the two components are spun from melt-blowing orifices having a side-by-side configuration. The polyethylene component may comprise from 7% to 99% by volume of the meltblown web. Preferably, the polyethylene component comprises from 7% to 50% by volume of the meltblown web and the polyester component comprises from 50% to 93% by volume of the meltblown web. More preferably, the polyethylene component comprises from 15% to 40% by volume of the meltblown web and the polyester component comprises from 60% to 85% by volume of the meltblown web. Most preferably, the polyethylene component comprises from 20% to 30% by volume of the meltblown web and the polyester component comprises from 70% to 80% by volume of the meltblown web.

The SMS composite sheets of the current invention can have a basis weight between 1.3 to 3.5 oz/yd$^2$ (44 to 119 g/cm$^2$), preferably between about 1.5 to 2.5 oz/yd$^2$ (51 to 85 g/cm$^2$), most preferably between about 1.6 to 2.0 oz/yd$^2$ (54 to 68 g/cm$^2$), with a Frazier air permeability in the range of 10 to 70 ft$^3$/min/ft$^2$ (3 to 21 cm$^3$/min/cm$^2$), preferably in the range of 12 to 40 ft$^3$/min/ft$^2$ (4 to 12 cm$^3$/min/cm$^2$), and most preferably in the range of 15 to 35 ft$^3$/min/ft$^2$ (5 to 11 cm$^3$/min/cm$^2$), and a hydrostatic head in the range of 35 to 150 cm H$_2$O, preferably 45 to 120 cm H$_2$O, and most preferably in the range of 55 to 100 cm H$_2$O.

The meltblown webs useful in forming the composite sheets of the current invention can be prepared using methods known in the art. Meltblowing dies generally comprise a plurality of meltblowing die orifices which are arranged in a linear array cross the face of the die. A linear low density polyethylene, optionally blended with a different polyethylene polymer and conventional stabilizers, etc., is melted in a conventional extruder, extruded through a melt blowing die and then attenuated with pressurized gas, which is generally heated air or inert gas to form a gas-borne stream of fibers. A plurality of gas-borne fiber streams, extruded through the plurality of extrusion orifices in the meltblowing die, form a curtain of meltblown fibers extending across the width of a moving collecting surface, such as a foraminous belt or another fabric, located below the meltblowing die. The collecting surface may be fitted with one or more vacuum chambers located beneath the collecting surface on which the meltblown web is collected, the vacuum functioning to conduct the air or inert gas stream through the collecting surface and away from the fibers deposited on the collecting surface. The web can optionally be passed through a nip formed by a pair of rolls to press the meltblown fibers together, however this is optional as the meltblown fibers generally form a cohesive meltblown web as they are deposited on the collecting surface.

In forming a multiple component or, for simplicity, a bicomponent meltblown web, two distinct polymeric components are melted in parallel extruders and metered separately to polymer conduits which are divided from each other in the die by a plate. One of the distinct polymeric components comprises linear low density polyethylene. The two distinct polymer components are then fed to an extrusion orifice where they are extruded into a jet of heated gas. Alternatively, the polymer components can be fed, in an already layered form, into the cavity of the a spin block from which the capillary orifices are supplied with a multiple component polymer stream.

The bicomponent meltblowing process can be performed using either pre-coalescent dies, wherein the distinct polymeric components are contacted prior to extrusion from the extrusion orifice, or post-coalescent dies, in which the distinct polymeric components are extruded through separate extrusion orifices and are contacted after exiting the capillaries to form the bicomponent fibers.

The meltblown filaments are generally fractured during the attenuation process to form discontinuous fibers, however they can also be continuous. In a preferred embodiment, the meltblown fibers are deposited onto the spunbond layer of this invention to create a multiple component meltblown web layer. It will be understood by those skilled in the art that multiple layers of meltblown webs can be formed, and that another spunbond layer according to the present invention can be formed on said meltblown layer(s) to form a sandwich structure of spunbond/meltblown/spunbond layers.

The multiple layers of the composite fabric can then be thermally bonded to one another. Thermal bonding temperatures in the range of 110° C. to 130° C. and bonding pressures in the range of 350–700 N/cm have been found to be suitable for thermal bonding of the composite SMS sheets of the current invention. Bonding is preferably done in a manner which preserves both the breathability and barrier properties of the fabric. For example, the bonding temperature and pressure should be selected such that pinholes are not formed in the meltblown layer which would reduce the barrier properties of the composite sheet. Alternate methods for bonding the layers of the composite sheet include calender bonding, through-air bonding, steam bonding, and adhesive bonding. For example, an adhesive may be applied in a discrete pattern between adjacent layers or as a continuous layer if the adhesive is a breathable adhesive.

TEST METHODS

In the description above and in the examples that follow, the following test methods were employed to determine various reported characteristics and properties. ASTM refers to the American Society for Testing and Materials.

Fiber Diameter was measured via optical microscopy and is reported as an average value in microns. For each spunbond sample the diameters of about 100 fibers were measured and averaged. The spunbond denier per filament was calculated using fiber size, ratios of PET and polyethylene in the bicomponent fiber, and the polymer densities of PET and polyethylene.

Basis Weight is a measure of the mass per unit area of a fabric or sheet and was determined by ASTM D-3776, which is hereby incorporated by reference, and is reported in $g/m^2$.

Grab Tensile Strength is a measure of the breaking strength of a sheet and was conducted according to ASTM D 5034, which is hereby incorporated by reference, and is reported in Newtons.

Percent Elongation is measured at the point where the sample initially fails and is the elongation at which the load peaks during the grab tensile measurement Frazier Air Permeability is a measure of air flow passing through a sheet under at a stated pressure differential between the surfaces of the sheet and was conducted according to ASTM D 737, which is hereby incorporated by reference, and is reported in $m^3/min/m^2$.

Hydrostatic Head, also referred to herein as hydrohead, is a measure of the resistance of the sheet to penetration by liquid water under a static pressure. The test was conducted according to AATCC-127, which is hereby incorporated by reference, and is reported in centimeters. In this application, unsupported hydrostatic head pressures are measured on the various sheet examples in a manner so that if the sheets do not comprise a sufficient number of strong fibers, the measurement is not attainable. Thus, the mere presence of an unsupported hydrostatic head pressure is also an indication that the sheet has the intrinsic strength to support the hydrostatic head pressure.

Abrasion Resistance was evaluated qualitatively by visual inspection of the surface of the fabric after physically rubbing the fabric several times between the thumb and forefinger. Samples which formed "fuzz" (i.e. loose fibers projecting from the fabric surface) were given a rating of poor, whereas samples which exhibited no fuzzing were rated as excellent.

EXAMPLES

Example 1

This example demonstrates preparation of a spunbond bicomponent fabric according to the current invention from a polyethylene component and a polyester component which were spun to form sheath-core bicomponent filaments with the polyethylene component in the sheath. The polyethylene component was made from a blend of high density polyethylene and linear low density polyethylene. The high density polyethylene had a melt index of 18 g/10 minutes (measured according to ASTM D-1238, 2.16 kg @ 190° C.) and a density of 0.954 $g/cm^3$ and is available from Equistar Chemicals as HDPE H-5618. The linear low density polyethylene was a copolymer of ethylene and 1-octene having a melt index of 27 g/10 minutes and a density of 0.940 $g/cm^3$, available from Dow as Aspun® 6811A. Pellets of the HDPE and LLDPE polymers were dry blended in a ratio of 60 wt % HDPE and 40 wt % LLDPE. The polyester component was poly(ethylene terephthalate) with a reported intrinsic viscosity of 0.53 dl/g available from DuPont as Crystar® polyester (Merge 4449). Prior to extrusion, the poly(ethylene terephthalate) resin was dried in a hopper dryer at an air temperature of 120° C. to a polymer moisture content of less than 50 parts per million.

The blend of LLDPE and HDPE was heated to 250° C. and the poly(ethylene terephthalate) was heated to 290° C. in separate extruders. The two polymer streams were separately extruded and metered to a spin-pack assembly, where the two melt streams were separately filtered and then combined through a stack of distribution plates to provide multiple rows of sheath-core filaments, with the core comprising poly(ethylene terephthalate) and the sheath comprising the blend of LLDPE and HDPE. The spin-pack assembly consisted of a total of 2016 round sheath-core extrusion capillaries (28 rows of 72 capillaries in each row). The width of the spin-pack in machine direction was 11.3 cm, and in cross-direction was 50.4 cm. Each of the extrusion capillaries had a diameter of 0.35 mm and length of 1.40 mm. The spin-pack assembly was heated to 295° C. and the polymer melt streams were spun through the each capillary at a total polymer throughput rate of 1.0 g/hole/min. The fibers were 62 volume percent poly(ethylene terephthalate) and 38 volume percent of the blend of HDPE and LLDPE.

The filaments were cooled as they exited the capillaries in a cross-flow air quench extending over a length of 19 inches (48.3 cm). The attenuating force was provided to the bundle of fibers by a rectangular slot jet. The distance between the face of the spinneret and the entrance of the slot jet was 25 inches (63.5 cm).

The fibers exiting the slot jet were collected on a forming belt that was moving at a speed of about 75 m/min. Vacuum was applied underneath the belt to help pin the fibers to the belt. The fibers were then thermally bonded in a nip formed between a set of embosser and anvil rolls, both rolls being heated to 128° C., with a nip pressure of 400 pounds/linear inch (700 N/cm). The thermally bonded sheet was then wound onto a roll. Sheet properties and spinning performance are summarized in Table 1 below.

Comparative Example 1A

A spunbond bicomponent sheet was made using the process described in Example 1 except that the polyethylene component was 100% LLDPE having a melt index of 27 g/10 minutes available from Dow as Aspun® 6811A. The spunbond sheet was bonded between a set of embosser and anvil rolls with both rolls being heated to 110° C., using a nip pressure of 200 pounds/linear inch (350 N/cm). Sheet properties and spinning performance are summarized in Table 1 below.

Comparative Example 1B

A spunbond bicomponent sheet was made as described in Example 1, except that the polyethylene component was made from 100% HDPE with a melt index of 18 g/10 minutes (measured according to ASTM D-1238, 2.16 kg @ 190° C.) and a density of 0.956 g/cm$^3$, available from Equistar Chemicals as HDPE H-5618 and the bonding was conducted using 120° C. roll temperature with 200 pounds/linear inch (350 N/cm) nip pressure. Sheet properties and spinning performance are summarized in Table 1 below.

The results in Table 1 demonstrate that the spinning performance using a blend of HDPE/LLDPE in the sheath is superior to that using LLDPE alone in the sheath, with little or no build-up of deposits on the spinneret face or in the quench ducts or draw jet compared to LLDPE alone which causes significant levels of deposits develop. The grab tensile properties using HDPE/LLDPE blend in the sheath are greatly superior to those for spunbond sheets where HDPE alone is used in the sheath even though the HDPE is the major component in the HDPE/LLDPE blend. The softness and drapeability of the fabric of Example 1 (60/40 HDPE/LLDPE in sheath) was surprisingly similar to that for Example 1A (LLDPE sheath) and much better than that of Example 1 B (HDPE sheath) which formed a rigid sheet.

TABLE 1

Spunbond Sheet properties

|  | Example 1 | Example 1A | Example 1B |
|---|---|---|---|
| Sheath Composition | 60/40 HDPE/LLDPE | LLDPE | HDPE |
| Basis Weight oz/yd$^2$ | 1.69 (57.3 g/m$^2$) | 1.76 (59.7 g/m$^2$) | 1.76 (59.7 g/m$^2$) |
| Grab Tensile Strength (XD), lbs | 32.6 (145.1 N) | 22.3 (99.2 N) | 12.6 (56.1 N) |
| % Elongation, XD grab | 12.5 | 90.6 | 13.4 |
| Grab Tensile Strength (MD), lbs | 35.4 (157.5 N) | 36.8 (163.8 N) | 20.0 (89 N) |
| % Elongation, MD grab | 12.5 | 96.3 | 14.1 |
| Frazier Air Permeability, ft$^3$/min/ft$^2$ | 141 (43.0 m$^3$/min/m$^2$) | 218 (66.4 m$^3$/min/m$^2$) | 194 (59.1 m$^3$/min/m$^2$) |
| Hydrohead, cms H$_2$O | 19.3 | 24.1 | 20.1 |
| Fiber diameter, μm | 10.5 | 11.6 | 11.0 |
| Abrasion Resistance | Excellent | Excellent | Poor |
| Spinning Performance |  |  |  |
| Build-up on spin-pack face, quench ducts, and draw jet | Excellent | Very Poor | Excellent |
| Broken Filaments | Excellent | Very Poor | Excellent |

Example 2

This example describes the preparation of a SMS composite sheet according to the invention by bonding a bicomponent meltblown web between two spunbond layers. The spunbond layers were prepared according to Example 1 except that the speed of the forming belt was about 195 m/min to obtain a spunbond web having a basis weight of 0.65 oz/yd$^2$ (22 g/m$^2$).

A meltblown bicomponent web was made with a polyethylene component and a polyester component. The polyethylene component was linear low density polyethylene comprising a copolymer of ethylene and 1-octene having a melt index of 150 g/10 minutes, available from Dow as Aspun® 6831A.

The polyester component was poly(ethylene terephthalate) with a reported intrinsic viscosity of 0.53 dl/g, available from DuPont as Crystar® polyester (Merge 4449). The LLDPE was heated to 260° C. and the poly(ethylene terephthalate) was heated to 305° C. in separate extruders and metered as separate polymer streams to a melt-blowing die assembly. The two polymer streams were independently filtered in the die assembly and then combined by a stack of polymer distribution plates to provide a side-by-side fiber configuration. The die was heated to 300° C. and had 624 capillary openings arranged in a 52.4 cm line. The polymers were spun through the each capillary attenuated with jets of pressurized hot air to form meltblown fibers and were collected on a moving forming screen located below the die to form a bicomponent meltblown web that was 20 weight percent LLDPE and 80 weight percent poly(ethylene terephthalate) and had a basis weight of 17 g/m$^2$. The meltblown web was wound on a roll.

The composite nonwoven sheet was prepared by unrolling a layer of the 0.65 oz/yd$^2$ (22 g/m$^2$) basis weight bicomponent spunbond web of Example 1 onto a moving belt. The meltblown bicomponent web was unrolled and laid on top of the moving spunbond web. A second roll of the 22 g/m$^2$ basis weight spunbond web was unrolled and laid on top of the spunbond-meltblown web to produce a spunbond-meltblown-spunbond composite nonwoven web. The composite web was thermally bonded between an engraved oil-heated metal calender roll and a smooth oil heated metal calender roll, each roll having a diameter of 466 mm. The engraved roll had a chrome coated non-hardened steel surface with a diamond pattern having a point size of 0.466 mm$^2$, a point depth of 0.86 mm, a point spacing of 1.2 mm, and a bond area of 14.6%. The smooth roll had a hardened steel surface. The composite web was bonded at a temperature of 110° C., a nip pressure of 200 lb/linear inch (350 N/cm), and a line speed of 50 m/min. The bonded composite sheet was collected on a roll. The composite sheet properties are summarized in Table 2 below.

Comparative Example 2A

A composite SMS fabric was prepared as described in Example 2, except that the two outer spunbond layers were prepared according to Comparative Example 1A (100% LLDPE sheath) using a forming belt speed of 195 m/min.

A bicomponent melt blown web was sandwiched between two outer spunbond layers, each having a basis weight of was 0.65 oz/yd$^2$ (22 g/m2). The bicomponent melt blown web used was prepared by the same procedure as described in Example 2. The composite sheet properties are summarized below in Table 2.

The results in Table 2 demonstrate that there is little or no degradation in composite sheet properties when HDPE is blended at relatively high levels with LLDPE in the sheath. The SMS composite sheet of Example 2 will be cheaper to produce compared to SMS composite sheets where LLDPE alone is used in the sheath. In addition to the cost benefits of using a HDPE/LLDPE blend, the composite sheet of Example 2 also benefits from the improved spinning performance of the blend compared to LLDPE as discussed above with regard to Table 1.

TABLE 2

SMS Sheet Properties

|  | Example 2 | Example 2A |
|---|---|---|
| Spunbond sheath composition | 60/40 HDPE/LLDPE | LLDPE |
| Basis Weight (oz/yd$^2$) | 1.8 (61 g/m$^2$) | 1.8 (61 g/m$^2$) |
| Grab Tensile Strength | 26.0 (115.7 N) | 21.0 (93.45 N) |

TABLE 2-continued

SMS Sheet Properties

| | Example 2 | Example 2A |
|---|---|---|
| (XD), lbs | | |
| % Elongation, XD grab | 3.3 | 3.9 |
| Grab Tensile Strength (MD), lbs | 34.0 (151.3 N) | 38.0 (169.1 N) |
| % Elongation, MD grab | 3.8 | 3.4 |
| Frazier Air Permeability, ft$^3$/min/ft$^2$ | 15.7 (4.8 m$^3$/min/m$^2$) | 16.1 (4.9 m$^3$/min/m$^2$) |
| Hydrohead, cms H$_2$O | 64.1 | 65.4 |
| Abrasion Resistance | Excellent | Excellent |

What is claimed is:

1. A spunbond nonwoven fabric comprising continuous multiple component filaments having a cross-section, a length, and a peripheral surface and comprising a polyester component and a polyethylene component arranged in substantially distinct zones across the cross-section of the multiple component filaments and extending substantially continuously along the length of the multiple component filaments, at least a portion of the peripheral surface of the multiple component filaments comprising the polyethylene component, and the polyethylene component comprising a blend of linear low density polyethylene copolymer consisting of ethylene copolymerized with minor amounts of an α-olefin having 3 to 12 carbon atoms and high density polyethylene homopolymer, the high density polyethylene being present in an amount greater than 50 weight percent of the polyethylene component.

2. The spunbond fabric according to claim 1 wherein the multiple component filaments are sheath/core bicomponent filaments, the core comprising the polyester component and the sheath comprising the polyethylene component.

3. The spunbond fabric according to claim 1 wherein the polyester component comprises poly(ethylene terephthalate).

4. The spunbond fabric according to claim 1 wherein the polyethylene component comprises between about 10 to 40 weight percent linear low density polyethylene and between about 60 to 90 weight percent of high density polyethylene.

5. The spunbond fabric according to claim 1 wherein the α-olefin co-monomer is selected from the group consisting of 1-octene, 1-hexene, and 1-butene.

6. The spunbond fabric according to claim 5 wherein the co-monomer is 1-octene.

7. The spunbond fabric according to claim 5 wherein the linear low density polyethylene is prepared using a Zeigler-Natta catalyst.

8. The spunbond fabric according to claim 2 wherein the sheath comprises between about 10 to 90 volume percent of the bicomponent filaments and the core comprises between about 90 to 10 volume percent of the bicomponent filaments.

9. The spunbond fabric according to claim 8 wherein the sheath comprises between about 30 to 45 volume percent of the bicomponent filaments and the core comprises between about 55 to 70 volume percent of the bicomponent filaments.

10. The spunbond fabric according to claim 1 wherein the multiple component filaments have a diameter of between 7 and 15 microns.

11. The spunbond fabric according to claim 10 wherein the diameter of the multiple component filaments is between 10 and 15 microns.

12. A composite sheet comprising:
a first layer having a first side and an opposite second side; and
a second layer attached to the first side of the first layer comprising a spunbond web of continuous multiple component filaments, the multiple component filaments having a cross-section, a length, and a peripheral surface and comprising a polyester component and a polyethylene component arranged in substantially distinct zones across the cross-section of the multiple component filaments and extending substantially continuously along the length of the multiple component filaments, the polyethylene component comprising a blend of linear low density polyethylene copolymer consisting of ethylene copolymerized with minor amounts of an α-olefin having 3 to 12 carbon atoms and high density polyethylene homopolymer, at least a portion of the peripheral surface of the multiple component filaments comprising the polyethylene component.

13. The composite sheet according to claim 12, wherein the first layer comprises a web of meltblown fibers.

14. The composite sheet according to claim 13, wherein the melt blown fibers have a length and a peripheral surface, the peripheral surface comprising a linear low density polyethylene component on at least a portion thereof.

15. The composite sheet according to claim 12, wherein the first layer comprises a microporous film.

16. The composite sheet according to claim 14, wherein the linear low density polyethylene comprises a copolymer of ethylene and a co-monomer selected from the group consisting of 1-octene, 1-hexene, and 1-butene.

17. The composite sheet according to claim 14 wherein the linear low density polyethylene in the first layer and that in the second layer are the same.

18. The composite sheet according to claim 17 wherein the linear low density polyethylene is a copolymer of ethylene and 1-octene.

19. The composite sheet according to claim 12 wherein the first layer comprises multiple component meltblown fibers.

20. The composite sheet according to claim 19 wherein the multiple component meltblown fibers further comprise a polyester component.

21. The composite sheet according to claim 20 wherein the multiple component meltblown fibers are side-by-side bicomponent meltblown fibers.

22. The composite sheet according to claim 21 wherein the spunbond filaments comprise bicomponent sheath-core filaments wherein the sheath comprises the polyethylene component and the core comprises the polyester component.

23. The composite sheet according to claim 22 wherein the polyester components comprise poly(ethylene terephthalate).

24. The composite sheet according to claim 23 wherein the bicomponent meltblown fibers comprise between about 7 to 99 volume percent of the polyethylene component and between about 93 to 1 volume percent of the polyester component, and wherein the bicomponent spunbond filaments comprise between about 10 to 90 volume percent of the polyethylene component and between about 90 to 10 volume percent of the polyester component.

25. The composite sheet according to claim 24 wherein the meltblown fibers comprise between about 15 to 40 volume percent of the polyethylene component and between about 85 to 60 volume percent of the polyester component, and wherein the spunbond filaments comprise between about 40 to 60 volume percent of the polyethylene component and between about 60 to 40 volume percent of the polyester component.

26. The composite sheet according to of claim 12, further comprising:

a third layer attached to the opposite second side of the first layer comprising a second spunbond web of continuous multiple component filaments, the spunbond filaments having a cross-section, a length, and a peripheral surface, and comprising a polyester component and a polyethylene component, the polyester and polyethylene components being arranged in substantially distinct zones across the cross-section of the multiple component filaments and extending substantially continuously along the length of the multiple component filaments, the polyethylene component comprising a blend of a linear low density polyethylene copolymer consisting of ethylene copolymerized with minor amounts of an α-olefin having 3 to 12 carbon atoms and a high density polyethylene homopolymer, at least a portion of the peripheral surface of the multiple component filaments comprising the polyethylene component.

27. The composite sheet according to claim 26 wherein the spunbond filaments of the second and third nonwoven layers have substantially the same cross-section and polymeric composition.

28. The composite sheet according to claim 26 wherein the spunbond multiple component continuous filaments of the second and third nonwoven layers comprise bicomponent sheath-core filaments wherein the polyester components form the core.

29. A gamma radiation sterilizable medical garment comprised of the composite sheet of claim 26.

* * * * *